United States Patent [19]

Horvath

[11] 3,948,565

[45] Apr. 6, 1976

[54] METHOD OF MAKING AND PIPELINE TRANSPORTING A NON-CORROSIVE SULFUR-WATER SLURRY

[75] Inventor: Richard J. Horvath, Houston, Tex.

[73] Assignee: Shell Oil Company, Houston, Tex.

[22] Filed: Mar. 23, 1971

[21] Appl. No.: 127,332

[52] U.S. Cl. .................................. 302/66; 302/14
[51] Int. Cl.² ........................................ B65G 53/30
[58] Field of Search ................................ 137/13; 302/14–16, 66

[56] References Cited
UNITED STATES PATENTS

| | | | |
|---|---|---|---|
| 2,917,345 | 12/1959 | Phillips et al. | 302/66 |
| 2,947,578 | 8/1960 | Corneil et al. | 302/66 |
| 3,012,826 | 12/1961 | Puff et al. | 302/66 |
| 3,168,350 | 2/1965 | Phinney et al. | 302/14 |
| 3,361,213 | 1/1968 | Savins | 137/13 X |
| 3,438,680 | 4/1969 | Scheuerman et al. | 302/14 |
| 3,476,441 | 11/1969 | Elliott | 302/66 |
| 3,480,332 | 11/1969 | Kuhre et al. | 302/66 |
| 3,547,497 | 12/1970 | Bolger | 302/66 |
| 3,606,483 | 9/1971 | Gable | 302/14 |

FOREIGN PATENTS OR APPLICATIONS 1,010,904    11/1965    United Kingdom.................. 302/66

*Primary Examiner*—Evon C. Blunk
*Assistant Examiner*—Jeffrey V. Nase

[57] ABSTRACT

An improved method of making and pipeline transporting a sulfur-water slurry which is non-corrosive and non-clogging.

7 Claims, No Drawings

METHOD OF MAKING AND PIPELINE TRANSPORTING A NON-CORROSIVE SULFUR-WATER SLURRY

The invention is directed to a new improved and novel method of making and transporting a sulfur-water slurry by pipeline which is noncorrosive and non-clogging by maintaining a passivating film of high strength ammonium sulfide and/or polysulfide solution between said sulfur-water slurry and the interior wall of the pipeline or contacting equipment. In the case of pipeline transporting such sulfur-water slurry at a minimum velocity of 3 ft/sec, the high strength ammonium polysulfide solution is injected into the slurry line under conditions so that a passivating film of high strength ammonium polysulfide is formed and maintained between the interior of the pipeline wall and the sulfur-water slurry transported in said pipeline wall and the sulfur-water slurry transported in said pipeline. By maintaining a high strength ammonium polysulfide barrier (film or coating) between the interior pipeline wall and the sulfur-water slurry which generally is maintained hot, corrosion and clogging of the pipeline can be inhibited or prevented. The high strength ammonium polysulfide film has been found to be essential in order to prevent direct contact of the sulfur-water slurry with the interior wall of the pipeline so as to prevent interaction between the sulfur and the interior surface of the pipeline wall and thereby prevent or inhibit corrosion, sulfide stress corrosion, hydrogen embrittlement and deposition of sulfur and sulfur products on the pipeline wall thereby preventing clogging and severe corrosive damage to pipelines and equipment used in making and handling such slurry systems.

BACKGROUND OF THE INVENTION

The transportation of sulfur as a water slurry in pipeline is well known in the art as noted by reference to U.S. Pat. No. 2,917,345 or 2,947,578. In making such a sulfur-water slurry, the sulfur is generally sprayed in molten form into water to form a slurry which can be transported through a pipeline. Formation of a stable non-corrosive slurry wherein the sulfur does not undergo any undesirable change and cause corrosion or the slurry does not exhibit a tendency to wide variation in viscosity is essential to the process in addition to other problems which may be encountered during its transportation through a pipeline. Thus, separation of the sulfur from the carrier fluid, plating or coating of the sulfur on equipment and pipeline walls causing plugging of the pipeline, corrosion, viscosity changes due to pressure and temperature variations encountered in the line requiring increases in pumping power which increases operation costs, etc., are only a few of the problems normally encountered in making sulfur-water slurried for transporting through pipelines.

Although the above are serious problems for consideration in making and transporting sulfur slurries through pipelines, nevertheless the transportation of sulfur in slurry form through pipelines can be made to be an effective and economic means of transportation, particularly since sulfur is recovered or obtained from isolated, remote and inaccessible areas, and must be transported to desired accessible areas. As noted above, a number of methods have been proposed for making sulfur slurries for pipeline transportation of such slurries such as injecting molten sulfur into water thereby forming a sulfur slurry for pipeline transportation. Such sulfur slurries when transporting through pipelines generally do not overcome the corrosion, coating and/or plugging problems described above.

An object of the present invention is to prepare for pipeline transportation a sulfur-water slurry which is stable, flowable and noncorrosive.

Another object of the present invention is to transport through a pipeline sulfur-water slurry without causing sulfur coating, deposition or plugging or corrosion of the pipeline.

Still another object of the invention is to form a slurry of sulfur in water, which when formed is stable, non-corrosive, and does not cause plugging when said slurry is transported through a pipeline and from which the sulfur can be readily recovered as essentially pure sulfur at the terminal end of the line.

Another object is to transfer sulfur as a water slurry by pipeline over great distances under non-corrosive conditions and at reduced pumping and handling costs.

Other objects will be apparent from the following description.

SUMMARY OF THE INVENTION

The present invention is directed to an improved, novel and new technique for preparing sulfur particles or pellets primarily for transportation as a sulfur-water slurry through pipelines which process is non-corrosive to the preparatory, transporting and recovery equipment, said process comprising maintaining a passivating film of high strength ammonium polysulfide $(NH_4)_2S_x$ where $x = 2–5$ between the interior ferrous wall of the equipment and the sulfur-water system while maintaining said sulfur-water system in a dynamic or static state and at an elevated temperature. The sulfur particles or pellets in the slurry should preferably have spherical shapes and dimensions in the ranges of 5–500, preferably 50–350 microns and still more preferred is having a mixture of different dimension of sulfur particles in the range of 5–20% in the 50–100 micron range and the balance 95–80% in the 150–350 micron range, prepared by injecting through multi-jet shrouded nozzles, the orifices opening of which can be varied, molten sulfur into a vessel of water which is in constant agitation while also injecting ammonia into said vessel so that it is in direct contact with the interior wall of the vessel. By controlling the jet orifice openings, the temperature of the molten sulfur from 150°F up to the melting point of sulfur, preferably in the range of 240°–320°F as it is injected into hot water directly or indirectly via a fluid (gaseous) barrier, while maintaining ammonium polysulfide in the system, corrosion is prevented and spherical sulfur particles or pellets are formed of controlled dimensions. Also due to the presence of high strength ammonium polysulfide in the system, agglomeration of sulfur is prevented. The amount of molten sulfur which can be injected into the water under conditions described in order to produce a stable non-clogging sulfur-water slurry can vary from about 5% to about 60%, preferably 10–40% sulfur in particles of pellet form of 50–350 microns, which is particularly suitable for pipeline transportation. Prior to injecting the sulfur-water slurry produced by the method described, the slurry should be in-line cooled to about 120°F or lower and thereafter injected into the main pipeline transporting system to a terminal station while at all times maintaining a film of high strength ammonium polysulfide between the inerior of the pipeline wall and the slurry. This can be done by injecting a solution of ammonium polysulfide along various points of the line where necessary and required. The high strength ammonium polysulfide in the line not only aids in preventing corrosion but improves flowability of the slurry by reducing friction and thereby reducing pumping costs. The amount of high strength ammonium polysulfide injected into and used in the pipeline should be sufficient to prevent direct contact of the slurry with the pipeline wall and is dependent on the amount of sulfur in the slurry, slurry temperature and slurry velocity. Generally the amount of high strength ammonium polysulfide required for this purpose can vary from about 1% to about 10% of the total slurry. By a high strength solution of ammonium polysulfide solution is meant an aqueous (water) solution of ammonium polysulfide represented by the formula $(NH_4)_2S_y$, where $y$ is 2-8 containing from 0.01% to 10% or higher of free colloidal sulfur.

The sulfur-water slurry can be prepared by injecting into a reaction vessel containing water, molten sulfur through one or a series of shrouded or shielded nozzles positioned in the vessel so that the molten sulfur is injected directly or indirectly into preferably hot water (170°–212°F) under constant agitation while also injecting high strength ammonium polysulfide solution into the sulfur-water slurry system until a slurry 20-40% sulfur in spherical particles or pellets of 50-350 microns has been formed. The high strength ammonium polysulfide sulfur-water slurry is removed from the slurry vessel and directed into an in-line where it is cooled to about 120°F or lower and thereafter injected into a transporting pipeline for terminal delivery while injecting, at intermediate points in the transporting pipeline, high strength ammonium polysulfide in amount sufficient to maintain a protective barrier between the interior pipeline wall and the slurry. At the terminal end of the pipeline the high strength ammonium polysulfide can be recovered and recycled for further use or sold or disposed at the terminal as the situation requires. The sulfur is separated from the water by conventional settling and/or filtration means. The sulfur recovered is in pellet or particle form which is easily handled and does not present a dusting or pollution problem.

The shrouded or shielded nozzles used to make the slurry can be those described in commonly assigned U.S. Pat. No. 3,663,478. Also rather than using one nozzle, a series of such nozzles can be installed in the slurry preparation vessel and the nozzle(s) can be positioned in various sections of the slurry preparation vessel. Thus the nozzles injecting molten sulfur into the water can be positioned above or below the water line in a downwards, upwards and/or sideward position and the hot water can be agitated or swirled in the same or opposite direction of the sulfur injection stream by any suitable means in order to get better sulfur particle size control. Thus if fine sulfur particles of 5-100 microns are desired, the water should be swirled in the direction opposite to the sulfur spray and when larger particles are desired, the swirling of the water should be stopped and its temperature dropped essential to ambient temperature.

The water carrier can contain anti-bonding or anti-agglomerating agents, suspending agents and additives which help keep the slurry stable during preparation, storage and pipeline transportation. Such materials include asphaltenes, polymers, surfactants, and these should be used in small amounts of 5-1000 ppm and should be readily removable from the sulfur slurry system at the recovery end of the line so that the recovered sulfur is pure and meets all commercial standards.

40–60% by weight of sulfur in water was prepared by direct injection of molten sulfur and a high strength (25-40% $NH_3$ and 20-40% $H_2S$) ammonium polysulfide solution containing 1.0%-45% free sulfur therein. The results of the presence of the ammonium polysulfide solution on the sulfur-water slurry system under varying conditions are shown in Tables 1-3.

At the terminal end of the line, the water was readily separated from the sulfur by settling and filtration.

The foregoing description of the invention is merely intended to be explanatory thereof. Various changes in the details of the described method may be made within the scope of the appended claims without departing from the spirit of the invention.

Table 1

EFFECT OF SULFUR CONTENT OF HIGH STRENGTH AMMONIUM SULFIDE SOLUTIONS ON CORROSION OF CARBON STEEL AT ELEVATED TEMPERATURES

| | Test Conditions | | | |
|---|---|---|---|---|
| Temp., °F | 180 | 180 | 212 | 266 |
| Solution Comp. %W | | | | |
| $(NH_4)S_x$ { $NH_3$ | 14.8 | 33.3 | 33.3 | 33.3 |
| { $H_2S$ | 12.5 | 28.1 | 28.1 | 28.1 |
| Water | Remainder | Remainder | Remainder | Remainder |

| Sulphur, %W | Corrosion Rate, mils/yr[a] | | | | | | | |
|---|---|---|---|---|---|---|---|---|
| | Liquid | Vapor | Liquid | Vapor | Liquid | Vapor | Liquid | Vapor |
| 0.25 | 3 | — | 3 | 2 | 5 | 40 | 110 | 90 |
| 0.55 | 3 | — | — | — | — | — | 7 | — |
| 0.85 | 2 | — | 3 | 2 | 5 | 4 | 8 | 98 |
| 2.85 | 3 | — | 3 | 2 | 5 | — | 6 | 89 |
| 4.85 | 4 | — | 3 | 2 | 4 | 4 | — | — |
| 5.85 | 3 | — | — | — | — | — | 9 | — |
| 6.05 | 2 | 3 | — | — | — | — | — | — |

[a]From weight loss and exposure time. No localized attack observed.

Table 2

EFFECT OF SALT CONTENT OF AMMONIUM POLYSULFIDE SOLUTIONS
ON CORROSION OF CARBON STEEL AT ELEVATED TEMPERATURES

| Test Conditions | | |
|---|---|---|
| Temperature, °F | 180 | 266 |
| Solution Composition, %W | | |
| $(NH_4)S_x$ $\begin{cases} NH_3 \\ H_2S \end{cases}$ | 14.8 / 12.5 | 33.3 / 28.1 |
| Sulfur | 6.0 | 0.85 |
| Water | Remainder | Remainder |
| NaCl, %W[b] | Corrosion Rate, mils/yr[a] | |
| 0 | 2 | 8 |
| 0.25 | 2 | — |
| 0.50 | 2 | 6 |
| 0.75 | 2 | 9 |
| 1.0 | 2 | — |
| 2.5 | 2 | 7 |
| 5.0 | 2 | — |

[a]From weight loss and exposure time. No localized attack observed.
[b]Basis total solution.

Table 3

CORROSION OF CARBON STEEL IN SULFUR-WATER SLURRY CONTAINING $(NH_4)S_x$

| $(NH_4)_2S_x$ %W | pH | Corrosion 72°F | Rate/mils/Yr. 140°F |
|---|---|---|---|
| 0 | 8.9 | 230 | 550 |
| 0.08 | 9.3 | 300 | 310 |
| 0.18 | 9.4 | 3 | 4 |
| 0.35 | 9.4 | 4 | 3 |
| 0.91 | 9.5 | 2 | 2 |
| 2.00 | 9.6 | 2 | 2 |

I claim as my invention:

1. A method for the production of a sulfur-water slurry wherein the sulfur is present in two particle size ranges comprising injecting a portion of molten sulfur into hot water under swirling conditions and injecting another portion into still water at a temperature lower than that of the agitated water.

2. The method of claim 1 wherein the slurry contains ammonium polysulfide and is cooled to below 120°F prior to being injected into a pipeline for transportation thereof.

3. A method for forming a sulfur-water slurry rendered non-corrosive to ferrous pipelines by the presence of ammonium polysulfide comprising injecting molten sulfur into water, a portion of the molten sulfur being injected into hot water under swirling conditions and a portion being injected into still water at a temperature lower than that of the agitated water, whereby a mixture of sulfur particles is produced in the range of about 5–75 microns and about 100–350 microns.

4. The method of claim 3 wherein the ammonium polysulfide is introduced after the slurry is formed.

5. The method of claim 3 wherein the molten sulfur is introduced into the water in the presence of ammonium polysulfide.

6. The method of claim 3 wherein the molten sulfur is injected into the water in the presence of ammonium polysulfide and subsequently ammonium polysulfide is added to the slurry.

7. A method of transporting sulfur through a pipeline to a terminal station while preventing corrosion and plugging of the line comprising the steps:
   a. injecting 5–50% molten sulfur into hot swirling water in the presence of high strength ammonium polysulfide through multi-shrouded nozzles, the direction of molten sulfur injection being opposite to the swirling action of the hot water, a portion being injected into still water at a temperature lower than that of the swirling water;
   b. cooling the slurry (a) to below 120°F;
   c. injecting slurry (b) into a pipeline while simultaneously injecting a high strength ammonium polysulfide solution into the line; and
   d. transporting by pipeline the high strength ammonium polysulfide-containing slurry system to a terminal station.

* * * * *